(12) United States Patent
Facchinello

(10) Patent No.: US 11,273,694 B2
(45) Date of Patent: Mar. 15, 2022

(54) TONNEAU COVER WITH BED RAIL SYSTEM

(71) Applicant: Tectum Holdings, Inc., Ann Arbor, MI (US)

(72) Inventor: Jerome Facchinello, Grand Blanc, MI (US)

(73) Assignee: Extang Corporation, Ann Arbor, MI (US)

( * ) Notice: Subject to any disclaimer, the term of this patent is extended or adjusted under 35 U.S.C. 154(b) by 63 days.

(21) Appl. No.: 16/878,781

(22) Filed: May 20, 2020

(65) Prior Publication Data
US 2020/0384838 A1    Dec. 10, 2020

Related U.S. Application Data

(60) Provisional application No. 62/857,913, filed on Jun. 6, 2019.

(51) Int. Cl.
| | |
|---|---|
| *B60J 7/185* | (2006.01) |
| *B60P 7/02* | (2006.01) |
| *B60J 7/12* | (2006.01) |
| *B62D 65/16* | (2006.01) |
| *B60J 7/08* | (2006.01) |
| *B62D 33/023* | (2006.01) |

(52) U.S. Cl.
CPC ............. *B60J 7/185* (2013.01); *B60J 7/12* (2013.01); *B60P 7/02* (2013.01); *B62D 65/16* (2013.01); *B60J 7/085* (2013.01); *B62D 33/023* (2013.01)

(58) Field of Classification Search
CPC ..... B60J 7/085; B60J 7/10; B60J 7/141; B60J 7/16; B60J 7/198; B60J 7/041; B60P 7/02; B60P 7/04
USPC ............ 296/100.01, 100.07, 100.16, 100.17
See application file for complete search history.

(56) References Cited

U.S. PATENT DOCUMENTS

| | | | |
|---|---|---|---|
| 4,730,866 A | | 3/1988 | Nett |
| 5,018,777 A | | 5/1991 | Swenson et al. |
| 5,174,353 A | | 12/1992 | Scjmeichel et al. |
| 5,228,739 A | | 7/1993 | Love |
| 5,275,458 A | | 1/1994 | Barben et al. |
| 5,301,913 A | | 4/1994 | Wheatley |
| 5,310,238 A | | 5/1994 | Wheatley |
| 5,460,423 A | | 10/1995 | Kersting et al. |
| 5,472,256 A | * | 12/1995 | Tucker .................... B60J 7/102 296/100.18 |
| 5,487,585 A | | 1/1996 | Wheatley |
| 5,540,475 A | | 7/1996 | Kersting et al. |
| 5,636,893 A | * | 6/1997 | Wheatley ................. B60J 7/141 16/354 |
| 5,655,808 A | | 8/1997 | Wheatley |
| 5,688,017 A | | 11/1997 | Bennett |

(Continued)

*Primary Examiner* — Gregory A Blankenship
(74) *Attorney, Agent, or Firm* — The Dobrusin Law Firm, P.C.

(57) ABSTRACT

A tonneau cover system for a cargo area of a vehicle. The tonneau cover system includes a tonneau cover and a bed rail system. The bed rail system includes a tonneau rail and an attachment mechanism. The attachment mechanism includes an attachment block that is configured to attach to the bed wall. An attachment finger of the tonneau rail is configured to engage the attachment block to attach the tonneau rail to the bed wall.

20 Claims, 4 Drawing Sheets

(56) References Cited

U.S. PATENT DOCUMENTS

| | | | |
|---|---|---|---|
| 5,788,315 A * | 8/1998 | Tucker | B60J 7/102 160/395 |
| 5,860,691 A | 1/1999 | Thomsen et al. | |
| 5,921,603 A * | 7/1999 | Karrer | B60P 7/08 296/39.2 |
| 5,931,176 A | 8/1999 | Isler et al. | |
| 6,024,401 A | 2/2000 | Wheatley et al. | |
| 6,024,402 A * | 2/2000 | Wheatley | B60J 7/102 224/403 |
| 6,059,159 A * | 5/2000 | Fisher | B60R 9/00 224/309 |
| 6,076,881 A * | 6/2000 | Tucker | B60J 7/141 296/100.07 |
| 6,183,035 B1 | 2/2001 | Rusu et al. | |
| 6,257,647 B1 | 7/2001 | Ninness et al. | |
| 6,340,194 B1 | 1/2002 | Muirhead et al. | |
| 6,669,264 B1 * | 12/2003 | Tucker | B60J 7/104 296/100.15 |
| 6,712,418 B1 | 3/2004 | Lathers | |
| 6,752,449 B1 | 6/2004 | Wheatley | |
| 7,093,811 B2 | 8/2006 | Wu | |
| 7,188,888 B2 | 3/2007 | Wheatley et al. | |
| 7,252,322 B2 | 8/2007 | Rusu | |
| 7,258,387 B2 | 8/2007 | Weldy | |
| 7,815,239 B1 | 10/2010 | Schmeichel | |
| 7,900,990 B2 * | 3/2011 | Townson | B60P 7/0815 296/100.16 |
| 8,807,625 B2 | 8/2014 | Garska | |
| 8,857,887 B1 | 10/2014 | Schmeichel | |
| 8,960,764 B2 | 2/2015 | Spencer | |
| 9,849,765 B2 | 12/2017 | Carlson | |
| 9,868,342 B2 | 1/2018 | Xu | |
| 10,023,035 B2 | 7/2018 | Facchinello | |
| 2002/0096268 A1 | 7/2002 | Schmeichel et al. | |
| 2002/0180235 A1 | 12/2002 | Wheatley | |
| 2003/0057726 A1 | 3/2003 | Wheatley | |
| 2004/0124658 A1 | 7/2004 | Wheatley | |
| 2004/0245799 A1 | 12/2004 | Rusu | |
| 2005/0146158 A1 | 7/2005 | Schmeichel et al. | |
| 2007/0110539 A1 | 5/2007 | Klinkman et al. | |
| 2008/0143133 A1 | 6/2008 | Nichols | |
| 2008/0179911 A1 | 7/2008 | Spencer et al. | |
| 2011/0316303 A1 * | 12/2011 | Maimin | B60J 7/141 296/100.07 |
| 2012/0274092 A1 | 11/2012 | Yue | |
| 2012/0274093 A1 | 11/2012 | Yue | |
| 2013/0001979 A1 | 1/2013 | Rusher et al. | |
| 2013/0341954 A1 * | 12/2013 | Maimin | B60J 7/1856 296/98 |
| 2013/0341960 A1 | 12/2013 | Garska | |
| 2014/0042754 A1 | 2/2014 | Spencer | |
| 2015/0102629 A1 * | 4/2015 | Potter | B60P 7/0876 296/100.16 |
| 2015/0130212 A1 | 5/2015 | Spencer | |
| 2016/0039274 A1 | 2/2016 | Smith et al. | |
| 2016/0096421 A1 | 4/2016 | Facchinello | |
| 2016/0114666 A1 * | 4/2016 | Xu | B60J 7/141 296/100.07 |
| 2016/0280123 A1 | 9/2016 | Rohr et al. | |
| 2017/0066311 A1 | 3/2017 | Facchinello et al. | |
| 2017/0144520 A1 | 5/2017 | Hemphill et al. | |
| 2017/0144521 A1 | 5/2017 | Carlson | |
| 2017/0174119 A1 | 6/2017 | Hemphill et al. | |
| 2017/0197498 A1 | 7/2017 | Facchinello | |
| 2017/0240033 A1 | 8/2017 | Dykewski, II et al. | |
| 2017/0259655 A1 | 9/2017 | Dykewski, II et al. | |
| 2017/0297474 A1 | 10/2017 | Hemphills et al. | |
| 2018/0118007 A1 * | 5/2018 | Facchinello | B60J 7/141 |
| 2018/0118008 A1 * | 5/2018 | Facchinello | B60J 7/198 |
| 2020/0130487 A1 * | 4/2020 | Dylewski, II | B60J 7/141 |
| 2020/0384838 A1 * | 12/2020 | Facchinello | B60J 7/185 |
| 2021/0170846 A1 * | 6/2021 | Cao | B60J 7/141 |

* cited by examiner

TONNEAU COVER WITH BED RAIL SYSTEM

PRIORITY

This application claims priority to U.S. Ser. No. 62/857,913 filed Jun. 6, 2019, the teachings of which are expressly incorporated by reference herein for all purposes.

FIELD

These teachings relate to tonneau covers, and more particularly to a bed rail system and method for attaching a bed rail system to a vehicle.

BACKGROUND

Tonneau cover bed rails are typically attached to the bed walls of a vehicle, and more particularly to the bed walls defining a cargo area of a vehicle. The bed rails can be attached to the bed walls with various attachment clips, latches, and/or clamps. A tonneau cover may then be attached to and/or supported on these bed rails.

While many tonneau covers and bed rails are suitable for their intended purpose, attaching some bed rails to a vehicle may be complicated and time consuming, and in some instances may even require holes to be drilled in the bed walls of the cargo area, which may be unappealing to some vehicle owners. Also, some attachment clips, latches, and/or clamps may become loose or dislodged due to bumping and/or vibrating experienced during some driving conditions, which may affect the structural integrity of the tonneau cover system.

What is needed is a tonneau cover and/or a bed rail system that overcomes at least some of the aforementioned limitations. For example, it may be desirable to have a tonneau cover bed rail system that can be quickly and easily attached to the bed walk of a cargo area of a vehicle. It may be desirable to have a tonneau cover bed rail system that can securely lock the bed rails to the bed walls of the cargo area to prevent loosening or dislodging of the bed rails during various driving conditions.

SUMMARY

These teachings provide a tonneau cover and/or a bed rail system that can be quickly and easily attached to the bed walls of a cargo area of a vehicle. These teachings provide a tonneau cover and/or a bed rail system that can securely lock bed rails to the bed walls of the cargo area to prevent loosening or dislodging of the bed rails during various driving conditions.

A tonneau cover system for a cargo area of a vehicle, the cargo area comprising a bed wall. The tonneau cover system comprising: a tonneau cover; and a bed rail system comprising an attachment mechanism that includes an attachment block configured to be attached to the bed wall, the bed rail system further includes a tonneau rail that includes an attachment finger. The attachment finger is configured to engage the attachment block to attach the tonneau rail to the bed wall.

These teachings provide a bed rail system comprising: a tonneau rail comprising an attachment finger; an attachment mechanism comprising an attachment block that is configured to attach to a bed wall of a vehicle; and a locking mechanism comprising a locking plate. The attachment finger is configured to engage a top portion of the attachment block, and the locking plate is configured to engage a bottom portion of the attachment block.

These teachings provide a tonneau cover system for a cargo area of a vehicle. The cargo area comprising a bed wall. The tonneau cover system comprises a tonneau cover and a bed rail system. The bed rail system comprises a tonneau rail comprising an attachment finger and a ledge. At least a portion of the tonneau cover is configured to contact the ledge. The system has an attachment mechanism comprising: an attachment block that is configured to attach to the bed wall. The attachment finger is configured to engage the attachment block to attach the tonneau rail to the bed wall.

These teachings provide a bed rail system comprising: a tonneau rail comprising: an attachment finger and an attachment mechanism. The attachment mechanism comprises an attachment block that is configured to attach to a bed wall of a vehicle. The attachment finger is configured to engage the attachment block to attach the tonneau rail to the bed wall. The attachment block is located between or sandwiched between an attachment surface of the bed wall and the bed rail.

DETAILED DESCRIPTION

Figure 1:
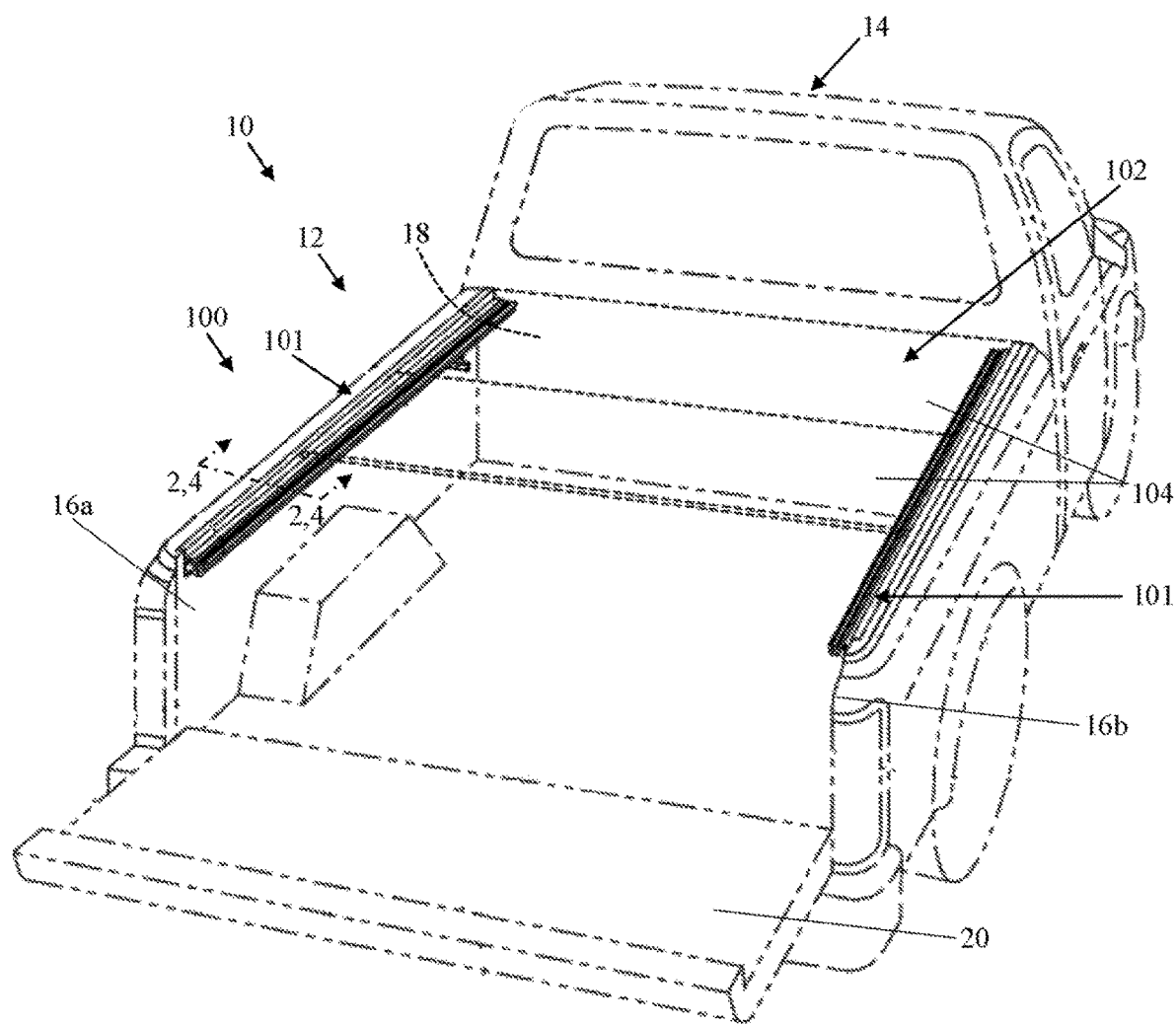
FIG. 1 is a perspective view of a vehicle.

The vehicle may be any vehicle that has a cargo area or bed. The cargo area or bed may be any area or portion of the vehicle used for storing or transporting goods or cargo. The cargo area may be any part of the vehicle that has an open top. The open top can be at least partially closed or covered by a cover, which may be a trunk, decklid, tonneau cover, cap, tent, tarp, board, or a combination thereof. The cargo area may be a cargo box, a bed, a trunk, or a combination thereof. The cargo area may also be a trailer that is configured to be pulled or pushed by the vehicle.

The cargo area may be defined by one or more bed walls. The one or more bed walls may be a fender, side wall, front wall, a back wall or tailgate, or a combination thereof. The bed rail system may be attached to or engage one or more of the walls of the cargo area. The bed rail may engage a top surface of the one or more bed walls, an inside surface of the one or more bed walls (i.e., a surface inside of the defined cargo area), an outside or exterior surface of the one or more bed walls (i.e., a surface outside of the defined cargo area).

One or more of the bed walls may be defined by or include a single wall or surface or more than one wall or surface. For example, one or more of the bed walls may include an outer wall and an inner wall. The outer wall may be located at the exterior of the vehicle and exposed to the environment. The outer wall may be made of metal, plastic, composite, or a combination thereof. The inner wall may be located under or within the outer wall and concealed under the outer wall. The inner wall may function to provide additional support and reinforcement to the outer wall. The inner wall may be made of metal, plastic, composite, or a combination thereof. The inner wall may be omitted from the vehicle bed.

The one or more walls and/or bed cap may include a downwardly turned portion. A downwardly turned portion may be a portion of the bed walls where the bed rail system is configured to be attached to. The downwardly turned portion may be located at an upper end or portion of the bed wall, opposite a bottom or floor of the cargo area. The downwardly turned portion is located opposite an exterior surface of the bed wall. The downwardly turned portion may be where a section of the bed wall or surface or bed cap turns or changes direction. The downwardly turned portion may be a portion of the wall which is angled or extends downwardly from the top surface of the bed wall and/or bed cap.

The one or more walls and/or the bed cap include an attachment surface. The attachment surface may be any part of the bed wall to which the bed rail system is configured to be attached. The attachment surface may be generally planar and arranged to face an inside of the cargo bed. The attachment surface may be located on or part of the downwardly turned portion. The attachment surface may be the surface immediately adjacent to the top surface of the bed walls. The attachment surface may be at or below a plane formed by the top surface of the cargo bed. The attachment surface may be generally perpendicular to the vehicle bed floor and the top surface of the bed cap, outer wall, or both. The attachment surface may be generally parallel to the vehicle bed floor and the top surface of the bed cap, outer wall, or both. The attachment surface may be a top surface of the bed cap, outer wall, or both. The attachment surface may be defined on two or more planes (i.e., top surface and inside surface). The attachment surface may be at an angle relative to the bed cap, outer wall, bed floor, or a combination thereof. The attachment surface includes one or more attachment holes.

One or more of the bed walls may include one or more attachment holes. The attachment holes function to connect the bed rail system to the bed wall. The attachment holes may be disposed through the outer wall, inner wall, a bed cap, one or more of the downwardly turned portions, the attachment surface, or a combination thereof. The one or more attachment holes may have a perimeter in the shape of a circle, square, rectangle, polygon, trapezoid, or the like. The one or more attachment holes may be place along the upper portion of the bed walls, adjacent to the top surface of the vehicle bed. The one or more attachment holes may be equally spaced along the length of the bed wall. The one or more attachment holes may be unequally spaced with some holes being closer together and other holes being farther apart. The one or more attachment holes may be provided by the vehicle manufacturer (i.e., by the OEM). The one or more holes may be made by a user or owner of the vehicle, or by an installer of the tonneau cover system or bed rail system. The one or more attachment holes may be located on two or more planes (i.e., top surface and inside surface of the bed wall or bed cap).

The tonneau cover may be any cover or covering. The tonneau cover may function to protect against dirt, debris, fluid, and/or other contaminants from entering an inside of a cargo area. The tonneau cover may function to conceal the inside of the cargo area and/or contents inside the vehicle bed. The tonneau cover may comprise one or a plurality of panels. The one or more of the panels can be moved or repositioned relative to one another and/or relative to the cargo area to move the tonneau cover between an open configuration and a closed configuration. The open configuration is where one or all of the panels are moved to provide access to the cargo area. The closed configuration is where one or all of the panels at least partially cover the cargo area.

The one or more panels may be configured to be roll-up into a closed configuration and unrolled into the open configuration. The one or more panels may be configured to be folded-up into a closed configuration and then unfolded into the open configuration. In some configurations, the tonneau cover may be a single panel cover. The single panel can be raised or pivoted relative to the walls or top surfaces of the vehicle bed and/or tailgate to move the tonneau cover from the closed configuration to the open configuration, and then lowered or pivoted downwards to the closed configuration.

One or more of the panels may be substantially rigid. One or more of the panels may be substantially flexible but stabilized with a rigid frame. The tonneau cover may be a canvas, fabric, a folded, or roll-up type tonneau cover. In some configurations, the tonneau cover may also be a truck cap or tent or other cover that increases a height of a cargo area.

The tonneau cover system may include one or more bed rail systems. A bed rail system may include one or more of any of the elements or features described and/or illustrated herein. The bed rail system comprises structure to attach or support the tonneau cover to the vehicle or vehicle bed or cargo area. The bed rail system comprises one or more tonneau rails, one or more attachment mechanisms and/or one or more locking mechanisms. The attachment mechanism and/or the locking mechanism may be substantially hidden from a top down view and/or a cross car view after installation to the bed wall or cargo area. Substantially hidden means that a user cannot see the attachment mechanism and/or the locking mechanism while looking at the bed rail system while standing in the bed or outside of the bed in any direction, for example from a top down view or a cross car view. Advantageously, this may provide for a cleaner or integrated appearance of the bed rail system with the vehicle and/or cargo area.

The bed rail system may include one or more attachment mechanisms. The one or more attachment mechanisms may provide a mount or support or sufficient structure to support the tonneau rail and/or to attach or secure the tonneau rail to the bed wall. The attachment mechanism may allow the tonneau rail to be attached or secured to the bed wall without drilling or adding additional holes through the tonneau rail, bed cap, and/or bed wall. The attachment mechanism may include one or more attachment blocks, one or more attachment fasteners, one or more attachment anchors, or a combination thereof.

The attachment mechanism may include one or more attachment anchors. The one or more attachment anchors may function to engage the bed wall, the bed cap, and/or an opening defined in the bed wall or bed cap. The attachment anchor may be made of plastic, steel, composite, or a combination thereof. The attachment anchor may have one or more holes, bores, or openings for receiving one or more fasteners. The attachment anchor may be located or installed in the bed wall and/or opening by the original equipment manufacturer (OEM) or installed in the bed wall or opening by an aftermarket installer or user. The attachment anchor may include one or more locking tabs or legs. The attachment anchor may be expandable. For example, the attachment anchor or lets thereof may expand pushing the locking tabs distally when a fastener is received in the anchor. The attachment anchor may be placed within the attachment holes of the inner wall, outer wall, bed cap, or a combination thereof. The attachment anchor may receive the attachment fastener. The attachment anchor may be threaded. For example, the attachment anchor is pushed into the attachment holes of the inner wall, outer wall, and bed cap and is locked in place when the attachment fastener in received, attaching the attachment block in position. The attachment anchor may be secured to the bed wall or bed cap via a suitable fastener, such as a screw, bolt, weld, fastener, hook and loop fastener, tape, clamp, or a combination thereof. The attachment anchor may be integrated with one or more elements of the attachment mechanism, such as an attachment block. The bed rail system may include one attachment anchor or a plurality of attachment anchors. The bed rail system may have a plurality of attachment anchors that are installed along a length of the bed wall or cap. For example, the system may include one or more attachment anchors, two or more attachment anchors, five or more attachment anchors, ten or more attachment anchors, etc. For example, the system may include forty or less attachment anchors, thirty or less attachment anchors, twenty or less attachment anchors, ten or less attachment anchors, five or less attachment anchors, etc.

The one or more attachment mechanisms may include one or more attachment blocks. The one or more attachment blocks may provide a mount for the tonneau rails after the attachment block is attached to the bed wall or bed cap. The attachment block may be made of plastic, steel, composite, or a combination thereof. The attachment block may be square, rectangular, triangular, circular, trapezoidal, or any other suitable shape to facilitate connecting with the tonneau rail. The attachment block may have one or more thru holes for receiving one or more of the attachment fasteners. The top portion and/or the bottom portion of the attachment block may be an area of thinned material, notched out, recessed, or undercut regions to receive the attachment finger, the locking plate, or both. That is, the attachment finger may hook over a thinned or notched out region. The locking plate may hook under a thinned or notched out region of the block. The attachment block may be configured to attach with the attachment channel of the tonneau rail.

The attachment block may be integrated with the attachment anchor into a single, common component. For example, the one or more tabs or legs of the attachment anchor may be provided on a backside of the attachment block, so that the attachment block can be secured to the bed wall or bed cap. In some configurations, the attachment mechanism and/or the attachment block may be clamped to one or more of the bed walls in addition to or instead of attaching the attachment block to the bed wall by way of the fastener and the attachment anchor. This may allow for attaching of the attachment mechanism and/or attachment block to the bed wall when no holes are present in the bed wall and/or if a user or operator does not wish to form holes in one or more of the bed walls.

The one or more attachment mechanisms may include one or more attachment fasteners. The one or more attachment fasteners may function to attach the attachment block, the attachment anchor, or both to the bed wall. The attachment fastener may be made of plastic, metal, composite, or a combination thereof. The attachment fastener may be threaded. The attachment fastener may be smooth. The attachment fastener may be a screw, a bolt, a pin, a rivet, a push fastener, a push pin, a nail, a weld, a projection, or another suitable fastener known in the art. The attachment fastener may be self-tapping. Self-tapping means that the fastener is configured to cut or otherwise form a thread in the component or element into which hit is received or driven. The attachment fastener may be expandable. The attachment fastener may be received within the anchor, through the inner wall, outer wall, bed cap, or a combination thereof. The attachment block may be integrated with the attachment fastener into a single, common component.

The one or more tonneau rails may function provide support for a tonneau cover to rest on when the tonneau cover or one or more panels are in the open or closed position. The tonneau rail may extend at least partially along an entire length of one or more of the bed walls. The tonneau rail may be an elongated component that is made of aluminum, metal, plastic, or a combination thereof.

The tonneau rail may include one or more attachment fingers. The attachment finger may function to engage the attachment mechanism to attach or connect the tonneau rail to the bed wall. The attachment finger may be an extension, projection, a hook, a notch, or any feature that functions to engage the attachment mechanism or the attachment block. The attachment finger may share a wall with the kicking channel, located outboard of the kicking channel. The attachment finger may be on the opposite side of the tonneau rail ledge. The attachment finger may be located in one or more discrete areas along an entire length of the tonneau rail. The attachment finger may extend along an entire length of the tonneau rail. The attachment finger may be located under the sealing member, near or adjacent to the open end of the locking channel, or both.

The tonneau rail may include one or more sealing members. The sealing member may function to create a fluid and/or debris seal between the bed cap, the outer wall, or both and the tonneau rail. The sealing member may be a planar projection, extending from the top surface of the tonneau rail outboard towards the bed wall. The sealing protrusion may include a seal or gasket for sealing against a top surface of the bed cap, the outer wall, the downwardly turned portion, or a combination thereof. The seal may be integrally formed with the sealing protrusion and/or the tonneau rail (i.e., co-extruded together). The seal may be attached to the sealing protrusion and/or the tonneau rail in a secondary operation. The seal may be a bulb seal, may be flat, or have whiskers. The seal may be formed from a rubber or plastic material The tonneau rail may include one or more locking channels. The locking channel may function to receive a portion of the locking mechanism. The locking channel may have a general U-shape cross-section, such that one side is open to allow a portion of the locking mechanism to enter. The open side may be located on the bottom surface of the locking channel so that the locking fastener may enter and be positioned within the locking channel. The locking channel may be omitted from the tonneau rail. The locking channel may include two or more positioning tabs which may function to locate the locking block within the locking channel and prevent vertical movement of the locking block. The protrusion tabs may be located above the locking block, below the locking block, or a combination thereof. The protrusion tabs may be omitted from the locking channel.

The one or more locking mechanisms may function to lock the tonneau rail to the attachment mechanism and the bed wall. The locking mechanism may secure the tonneau rail to the attachment block by connecting a locking plate across the bottom surface of the locking channel of the tonneau rail and the bottom surface of the attachment block. The locking fastener may be disposed through the locking plate and received within the locking block. The locking block may be located within the locking channel of the tonneau rail between the two or more positioning tabs. The locking mechanism may restrict or prevent vertical movement, horizontal movement, or any movement of the tonneau rail relative to the attachment mechanism and/or the bed wall.

The one or more locking mechanisms may include one or more locking blocks. The locking block may function to receive the locking fastener, securing the locking plate to the locking channel and the attachment block. The locking block may be made of plastic, metal, composite, or a combination thereof. The locking block may have any cross-section which is capable of being received within the locking channel and vertically positioned by the positioning tabs. For example, the locking block may have a rectangular cross-section. The locking block may be integrated with the locking channel. For example, the locking block and the tonneau rail are a unitary component where the locking fastener directly engages the tonneau rail. The locking block may be integrated with the locking fastener, the locking plate, or both. The locking block may be slidably positioned longitudinally in the locking channel. The locking block may have a thru-hole which receives the locking fastener. The thru hole may be threaded. The thru hole may be smooth. The that hole may be notched or patterned. The locking block may removably connect with the locking fastener.

The one or more locking mechanisms may include one or more locking fasteners. The locking fastener may function to attach the locking plate with the bottom surface of the locking channel and the bottom surface of the attachment block, securing the tonneau rail in place. The locking fastener may be plastic, metal, composite, or a combination thereof. The locking fastener may include an anti-friction coating. The locking fastener may be threaded. The locking fastener may be smooth, or substantially free of any threads. The locking fastener may be a screw, a bolt, a pin, a rivet, a push fastener, or another suitable fastener known in the art. The locking fastener may be a self-tapping fastener. Self-tapping means that the fastener is configured to cut or otherwise form a thread in the component or element into which hit is received or driven. The locking fastener may be expandable. The locking fastener may be received within the locking block, through the locking plate, holding the locking plate against the bottom surface of the locking channel and the bottom surface of the attachment block, locking the tonneau rail to the bed wall.

The one or more locking mechanisms may include one or more locking plates. The locking plate may lock the tonneau rail to the attachment mechanism, securing the tonneau rail to the vehicle bed. The locking plate may be plastic, metal, composite, or a combination thereof. The locking plate may have any shape suitable for interacting with the bottom surface of the tonneau rail and the attachment mechanism. The locking block may include a thru-hole to allow the locking fastener to pass through and connect with the locking block, the tonneau rail, or both, securing the locking plate against the bottom surface of the locking channel and bottom surface of the attachment block.

In some configurations, the locking plate may be integrated with the attachment block, forming a common part. For example, the attachment block including the locking plate connects to the bed wall so that the attachment finger engages the top surface of the attachment block and the tonneau rail is dropped on top of the locking plate, allowing the locking fastener to be fastened through the locking plate into the tonneau rail. The locking plate may include locking fingers. The locking fingers may be configured to mate with the bottom notched portion of the attachment block, the bottom surface of the locking channel, or both. The locking fingers may assist in securing the tonneau rail to the attachment mechanism and the bed wall.

FIG. 1 illustrates a vehicle 10. The vehicle 10 comprises a vehicle bed or cargo area 12 and a passenger cab 14. The cargo area 12 comprises bed walls that include: opposing side bed walls 16a, 16b, a front bed wall 18 that is located adjacent the passenger cab 14, and a rear bed wall or tailgate 20. A tonneau cover system 100 can be attached to the cargo area 12 of the vehicle 10. The tonneau cover system 100 comprises a bed rail system 101 and a tonneau cover 102.

The bed rail system 101 can be attached to one or more of the bed walls 16a, 16b, 18, 20. While FIG. 1 illustrates the bed rail system 101 attached to both of the side bed walls 16a, 16b, and the following description focuses on the bed rail system 101 being attached to the bed wall 16a, it is understood that the bed rail system 101 can be attached to one or more of any of the bed walls 16a, 16b, 18, 20. Of course, one or more of the bed walls 16a, 16b, 18, 20 may be free of a bed rail system 101, for example like wall 20 and 18 as shown in FIG. 1

The tonneau cover 102 comprises one or more panels 104. In the closed position, at least a portion of the tonneau cover 102 is configured to contact or rest on at least a portion of the bed rail system 101 to close or cover the open top of the cargo area 12. The tonneau cover 102 may be used to conceal the inside of the cargo area 12 and/or protect against dirt, debris, fluid, and/or other contaminants from entering the cargo area 12.

Figure 2:
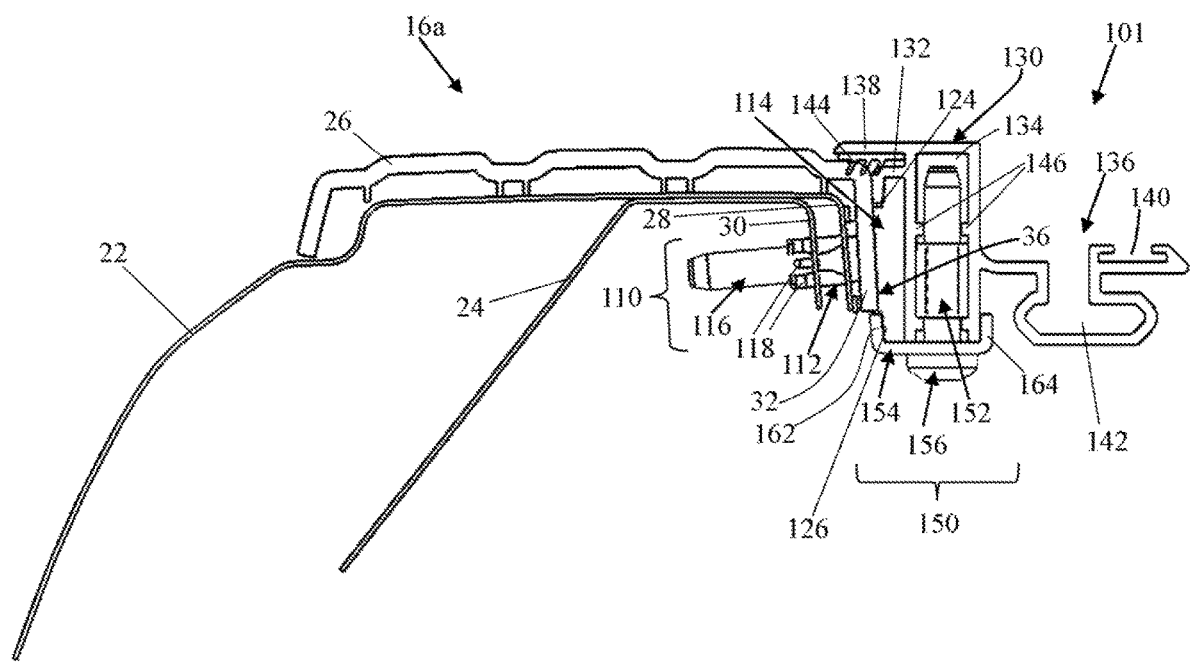
FIG. 2 is a cross-sectional view of a bed rail system taken long line 2,4-2,4 of FIG. 1.

FIG. 2 is a cross-sectional view of the bed rail system 101 attached with the bed wall 16a, taken along line 2,4-2,4 in FIG. 1. The bed wall 16a includes an outer wall 22 and an inner wall 24. The outer wall 22 surrounds the inner wall 24. A bed cap 26 may be placed over a top surface of the outer wall 22. In other configurations, the bed wall 16a may include only the outer wall 22 or only the inner wall 24. The bed cap 26 may be optional.

The outer wall 22, the inner wall 24, and the bed cap 26 may each comprise a respective downwardly turned portion or flange 28, 30, 32. Each of the downwardly turned portions or flanges 28, 30, 32 include one or more attachment holes 34 (see FIG. 3A). The holes 34 or openings are preferably at least partially aligned or concentric so that a fastener or member, such as element 112, 120, 114, 116, can at least partially engage or at least partially pass therethrough.

Figure 3A:
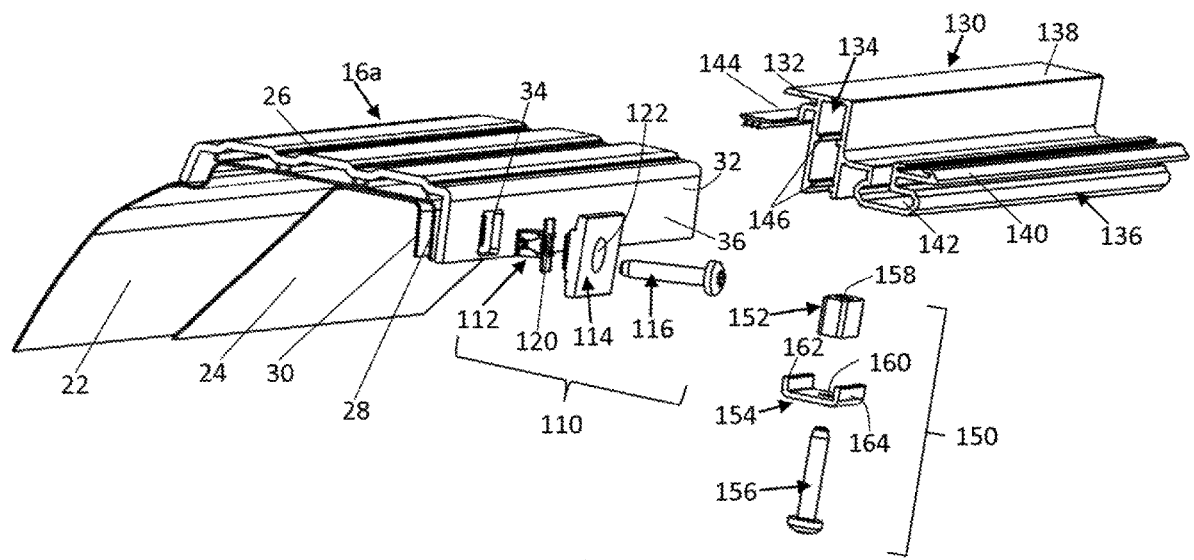
FIG. 3A is an exploded view of the bed rail system.
Figure 3B:
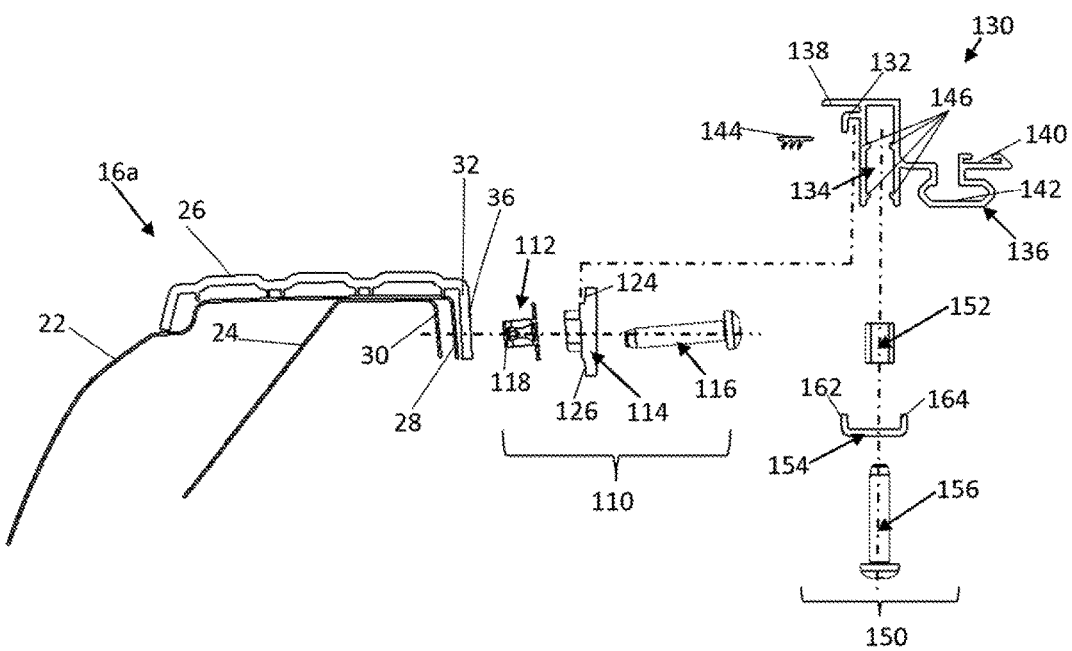
FIG. 3B is an exploded view of the bed rail system.

The downwardly turned portion 32 of the bed cap 26 is located closest to the inside of the cargo area 12 and thus comprises an attachment surface 36 (See FIGS. 3A, 3B). However, in configurations that do not include a bed cap 26, the downwardly turned portion 28 of the outer wall 28 would be located closest to the inside of the cargo area 12 and would thus comprise the attachment surface 36. Of course, if the side wall 16a only includes the inner wall 24, then the respective downwardly turned portion of the inner wall 24 would comprise the attachment surface 36.

The bed rail system 101 comprises one or more attachment mechanisms 110; one or more tonneau rails 130; and/or one or more locking mechanisms 150.

The attachment mechanism 110 is configured to engage or connect to the bed wall 16a and/or bed cap 26 and provide an attachment structure or support structure for the tonneau rail 130. The locking mechanism 150 is configured to lock the tonneau rail 130 to the attachment mechanism 110 to restrict or prevent movement and separation of the tonneau rail 130 and the attachment mechanism 110.

The attachment mechanism 110 comprises one or more attachment anchors 112; one or more attachment blocks 114; and/or one or more attachment fasteners 116.

The attachment anchor 112 comprises one or more legs 118 that are configured to engage and/or at least partially extend through one or more of the attachment holes 34 defined in one or more of the downwardly turned portions 28, 30, 32.

The attachment anchor 112 and the attachment block 114 each comprise a respective opening 120, 122 (FIG. 3A). The attachment fastener 116 is configured to extend through the openings 120, 122 to connect or secure the attachment block 114 to the attachment anchor 112 and to the bed wall 16a and/or bed cap 26.

A top portion of the attachment block 114 comprises one or more upper notched or tapered portions 124. A bottom portion of the attachment block 114 comprises one or more lower notched or tapered portion 126 (See also FIG. 3B).

The tonneau rail 130 comprises one or more attachment fingers 132, one or more locking channels 134; one or more arms 136 that cantilever from the locking channel 134; and one or more sealing members 136.

The attachment finger 132 of the tonneau rail 130 is configured to engage the attachment block 114. More specifically, the attachment finger 132 comprises a hook or downwardly facing extension or finger that may be an L-shape or U-shape that is configured to hook over the top, portion 124 of the attachment block 114 to connect the tonneau rail 130 to the attachment block 114. Accordingly, at least a portion of the attachment finger 132 is located between or is sandwiched between the attachment surface 36 and the attachment block 114 after the attachment finger 132 engages the attachment block 114. Sandwiched between means that at least a portion of the finger 132 is in contact with, in close proximity to, and/or located between, the attachment surface 36 and the attachment block 114.

The locking channel 134 is configured to cooperate with the locking mechanism 150 discussed further below to lock or secure the tonneau rail 130 to the attachment mechanism 110 to restrict or prevent relative movement between the tonneau rail 130 and the attachment mechanism 110 and the bed wall 16a.

The arm 136 of the tonneau rail comprises a ledge 140 and a drain channel 142. When the tonneau cover 102 is in a closed position, one or more of the panels 104 are configured to contact or rest on or be in close proximity to the ledge 140. One or more seals may be provided between the ledge 140 and one or more of the panels 104. The one or more seals may function to restrict or prevent fluid and/or other debris from entering the cargo area 12 of the vehicle 10 between the tonneau cover 102 and the tonneau rail 136. The one or more seals may also function to reduce or eliminate BSR issues (buzz, squeak, and raffle) that may occur as a result of the tonneau cover 102 contacting the ledge 140 during driving conditions.

The drain channel 142 is configured to collect fluid and/or debris and provide a passageway for maintaining and/or evacuating the fluid and/or debris. The fluid and/or debris may be evacuated from within the drain channel 142 in a fore-aft direction.

The sealing member 136 comprises a seal 144. The sealing member 136 and seal 144 extend outwardly from the locking channel 134 (i.e., in a direction away from the center of the cargo area 12). The seal 144 is configured to contact and seal against a top surface of the bed cap 26 and/or against the downwardly turned portion 32 of the bed cap 26 to restrict or prevent fluids and/or debris from entering a space or gap defined between the bed cap 26 and the tonneau rail 130 and ultimately into the cargo area 12. In configurations without a bed cap 26, the sealing member 136 and/or seal 144 are configured to contact and seal against a top surface of the bed wall 16a and/or against the downwardly turned portion 28 of the outer wall 28.

The locking mechanism 150 comprises one or more locking blocks 152, one or more locking plates 154, and/or one or more locking fasteners 156.

The locking block 152 is configured to be received into the locking channel 134 of the tonneau rail 130. The locking block 152 is held in place within the channel 134 or restricted from rotating or otherwise moving inside of the locking channel 132. This may be accomplished via one or more locking tabs 146. The locking tabs 146 may be tabs, fingers, or projections extending inwardly into the channel 132 from one or both of the walls defining the locking channel 132.

The locking plate 154 comprises one or more locking legs 162, 164. One or more of the locking legs 162 are configured to engage or hook over or around the lower portion 126 of the attachment block 114, and one or more of the other locking legs 164 is configured to engage or hook over or around one of the walls defining the locking channel 134 of the tonneau rail 132, The locking plate 154 may have a generally U or V shape.

The locking block 152 and the locking plate 154 each comprise one or more aligned openings 158, 160 (FIG. 3A) for the locking fastener 156 to pass therethrough.

Referring to FIGS. 1, 2, 3A and 3B, a method for attaching the bed rail system 101 to the bed wall 16a will be described. It is understood that any of the method steps disclosed herein may be performed in any order. Moreover, one or more of the following method steps can be combined with other steps; can be omitted or eliminated; can be repeated or duplicated; and/or can separated into individual or additional steps.

The method includes a step of engaging the attachment anchor 112 with bed wall 16a and/or bed cap 26. More specifically, the method includes a step of inserting, placing, or otherwise engaging the legs 118 of the attachment anchor 112 at least partially into or through the attachment hole 34 defined in the attachment surface 36 of one or more of the downwardly turned portion 28, 30, 32 of the bed cap 26, the outer wall 22, the inner wall 24, the bed wall 16a, or a combination thereof. During this inserting, placing, or otherwise engaging step, the legs 118 may be configured to compress or flex inwardly while engaging or passing through the attachment hole 34 and then spring outwardly back into a steady state position after passing through the attachment hole 34 thereby securing, attaching or locking the attachment anchor 112 with the bed wall 16a.

The method includes a step of engaging the attachment fastener 116 with the attachment block 114 and the attachment anchor 112 to attach the attachment block 114 to the attachment anchor 112, the bed wall 16a, or both. More specifically, the method includes a step of inserting, placing, or otherwise passing the attachment fastener 116 through the openings 120, 122 defined in the attachment anchor 112 and the attachment block 114 to attach the attachment block 114 to the attachment anchor 112, the bed wall 16a, or both. Passing the attachment fastener 116 through the attachment anchor 112 also functions to spread the legs 118 of the attachment anchor 112 to further secure or anchor the attachment anchor 112 to the bed wall 16a.

In some configurations the attachment anchor 112 may be combined with or integrated with the attachment block 114. That is, the attachment block 114 may include one or more of the legs 118 that engage the attachment hole(s) 34. In such a configuration, the fastener 116 may be eliminated, or the fastener 116 may be used to maintain the legs 118 in a spread or engaged configuration to prevent movement or withdrawal of the attachment block 114 from the attachment hole 34.

The method includes a step of engaging the tonneau rail 130 with the attachment block 114. More specifically, the method includes a step of engaging or hooking the attachment finger 132 of the tonneau rail 130 over or onto or around the attachment block 114, or over or around the upper portion 124 of the attachment block 114. The upper portion 124 may be notched or recessed to aid in the hooking step and/or in retaining the attachment finger 132 after the hooking, step. After this engaging or hooking over step and before any locking steps, the tonneau rail 130 may be moved or slid along a length of the bed wall, for example in a forward direction towards the passenger area or towards the tailgate. Such an adjusting step advantageously allows the tonneau rail 130 to be moved into a correct or adjusted position before being locked to the attachment block and bed walls. After the engaging or hooking-over step and/or after the adjusting step, the attachment finger 132 is sandwiched or located between the attachment surface 36 and the attachment block 114. After this engaging or hooking-over step, the attachment block 114 is sandwiched or located between the tonneau rail 130 and the attachment surface 36 of the bed wall 6a and/or the anchor 112. Sandwiched between means that at least a portion of the attachment block 114 is in contact with, in close proximity to, and/or located between, the rail 130 and the attachment surface 36.

The method includes a step of engaging the locking block 152 with the tonneau rail 130. More specifically, the method includes a step of inserting, placing, or otherwise engaging the locking block 152 into the locking channel 134 of the tonneau rail 130. The locking channel 134 comprises one or more locking tabs 146 that may be projections, tabs, or other interference members that function to at least partially hold or retain the locking block 152 inside of the channel 134 to prevent movement or rotation of the locking block 152 within the locking channel 134. The locking tabs 146 may be optional and omitted in certain configurations. In other configurations, the locking tabs 146 may be only located above the locking block 152, or only below the locking block 152. Additionally, or alternatively, in some configurations, the locking tabs 146 may be provided on the locking block 152. The locking tabs 146 may be flexible, compressible, biasable, resilient, deformable. The locking tabs 146 form an interference or friction fit with the locking block 152, the locking channel 134, or both.

The method includes a step of engaging the locking plate 154 with the attachment block 114 and the locking channel 134. More specifically, the method includes a step of engaging or hooking the locking leg 162 of the locking plate 154 with or behind or over or around the lower portion 126 of the attachment block 114 and the other locking leg 164 of the locking plate 154 with or behind or over or around the locking channel 134 of the tonneau rail 130.

In some configurations, the locking block 152 and the attachment plate 154 may be connected together and installed in one step. In some configurations, the locking block 152 and the attachment plate 154 may be a single, integrated component and installed in one step.

The method includes a step of engaging the locking block 152 and the locking plate 154 with the locking fastener 156 to lock the tonneau rail 130 to the attachment mechanism 110 and thus the bed wall 16a. More specifically, the method includes a step of inserting, placing, or otherwise passing the locking fastener 156 through the openings 158, 160 defined in the locking block 152 and the locking plate 154 to lock the tonneau rail 130 to the attachment mechanism 110 and thus the bed wall 16a.

Figure 4:
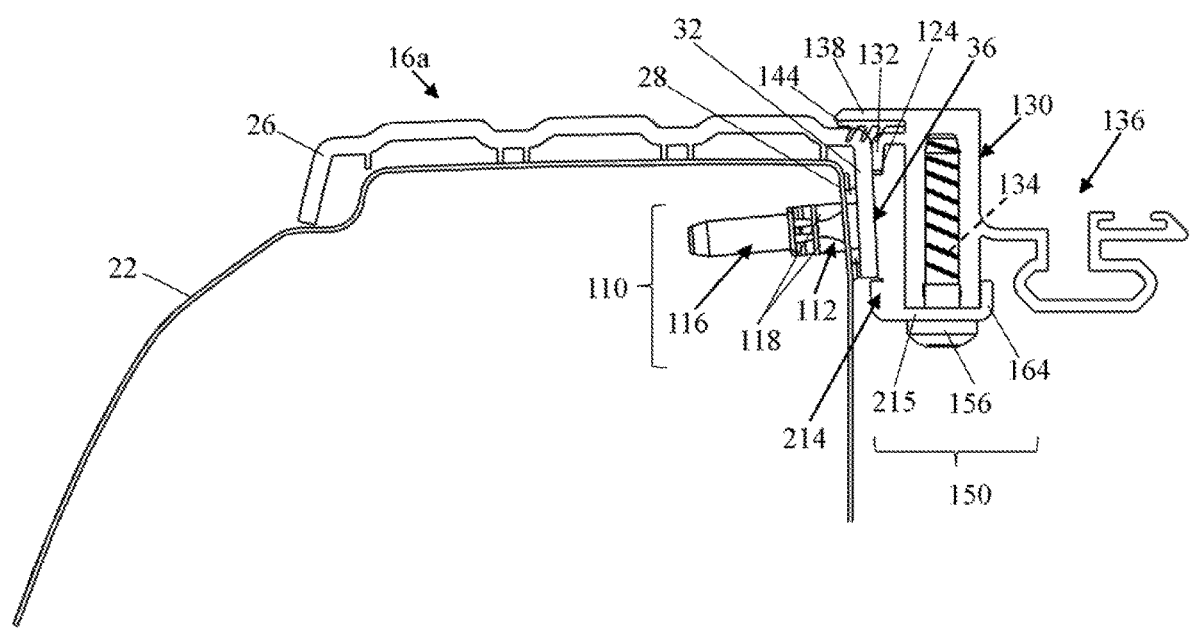
FIG. 4 is a cross-sectional view of a bed rail system taken long line 2,4-2,4 of FIG. 1.

FIG. 4 is a cross-sectional view of the bed rail system 101 attached with the bed wall 16a, taken along line 2,4-2,4 in FIG. 1. Many elements in FIG. 4 are common or similar to the elements discussed above in FIGS. 1-3B; therefore, similar elements will not be repeated and/or described again. It is understood that one or more of the elements illustrated and discussed above with reference to FIGS. 1-3B may be incorporated into the cross-section illustrated in FIG. 4, and one or more of the elements illustrated and discussed below with reference to FIG. 4 may be incorporated into the illustrations of FIGS. 1-3B.

The downwardly turned portion 28 of the outer wall 22 of the bed wall 16a in FIG. 4 is more vertical than the downwardly turned portion 28 of the outer wall 22 of the bed wall 16a in FIG. 2. This may be the case of a composite cargo area 12 and/or bed wall 16a, The bed wall 16a in FIG. 4 is also shown without the inner wall 24; however, in some configurations, the inner wall 24 may be included and have a downwardly turned portion similar to the illustrated turned portion 28 of the outer wall 22. The bed cap 26 may be optional.

In FIG. 4, the locking block 152 of the locking mechanism 150 from the previous figures is omitted. Instead, the locking fastener 156 is configured to directly engage the tonneau rail 130. The locking fastener 156 may be a self-tapping fastener. Self-tapping means that the fastener 156 is configured to cut or otherwise form a thread in the tonneau rail 130 while the fastener 156 is being secured or screwed into or engaged into the rail 130. Additionally, or alternatively, the fastener 156 may provide enough interference fit with the tonneau rail 130 without forming a thread.

In FIG. 4, the locking plate 154 and the attachment block 114 illustrated in the previous figures is combined into a single, integral component, and identified in FIG. 4 as attachment block 214. This means that the structure and function of attachment block 214 remains substantially the same as the locking plate 154 and the attachment block 114 illustrated and discussed above. During assembly, similar to the version of FIG. 2 discussed above, the attachment fastener is passed 116 through the openings 120, 122 defined in the attachment anchor 112 and the attachment block 214 to attach the attachment block 214 to the attachment anchor 112 and the bed wall 16a. The attachment finger 132 of the tonneau rail 130 can then be hooked over or onto or around the upper portion 124 of the attachment block 214. After this engaging or hooking-over step, the attachment finger 132 is sandwiched between the attachment surface 36 and the attachment block 214. Sandwiched between means that at least a portion of the finger 132 is in contact with, in close proximity to, and/or located between, the attachment surface 36 and the attachment block 214.

The bottom portion of the open end of the locking channel 134 is then dropped onto or rests on the plate portion 215 of the former locking plate and is contained or restricted from moving by the locking finger 164. Fastener 156 may then be inserted through the opening (i.e., opening 160 in plate 154; see FIG. 3A) defined in the attachment block 214 to lock the tonneau rail 130 to the attachment mechanism 110 and thus the bed wall 16a. The fastener 156 may directly engage the tonneau rail 130 (i.e., self-tapping fastener, as was discussed above) or may engage the locking block 152 in the version described above and illustrated in FIGS. 1-3B.

In some configurations, the cargo area 12 may include an accessory rail that extends along a length of the bed wall 16a. The accessory rail may be installed by the OEM, or the accessory rail may be attached to the bed wall 16a as an after-market component. In such configurations, rather than installing or attaching the attachment block 114, 214 to the bed wall 16a and/or bed cap 26 as we have described herein, the attachment block 114, 214 may be attached directly to the accessory rail in a similar fashion as we have described herein. In other configurations, the attachment block 114, 214 may be attached to the accessory rail by way of other fasteners or clamps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A tonneau cover system for a cargo area of a vehicle, the tonneau cover system comprising:
   a tonneau cover; and
   a bed rail system comprising an attachment mechanism that includes an attachment block, the bed rail system includes a tonneau rail that includes an attachment finger;
   wherein the attachment block is configured to engage an attachment hole defined in an attachment surface to which the tonneau rail is configured to be attached; and
   wherein the attachment finger is configured to engage the attachment block to attach the tonneau rail to the attachment surface.

2. The tonneau cover system according to claim 1, wherein the attachment block is located between a bed wall of the cargo area and the tonneau rail after the tonneau rail is attached to the attachment surface.

3. The tonneau cover system according to claim 1, wherein the attachment hole is defined in a bed wall of the cargo area and/or in a bed cap.

4. The tonneau cover system according to claim 1, wherein the attachment mechanism comprises an attachment anchor that is configured to engage the attachment hole, and the attachment block is configured to engage the attachment anchor to attach the attachment block to the attachment surface.

5. The tonneau cover system according to claim 4, wherein the attachment mechanism comprises an attachment fastener that is configured to extend into or through the attachment block, the attachment anchor, and/or the attachment hole.

6. The tonneau cover system according to claim 1, wherein the attachment finger is configured to hook over at least a top portion of the attachment block.

7. The tonneau cover system according to claim 1, wherein a locking plate is configured to engage the tonneau rail and the attachment block.

8. The tonneau cover system according to claim 7, wherein the attachment finger is configured to engage a top portion of the attachment block and the locking plate is configured to engage a bottom portion of the attachment block.

9. The tonneau cover system according to claim 7, wherein the tonneau rail comprises a locking channel, and wherein the locking mechanism comprises a locking block that is received into the locking channel.

10. The tonneau cover system according to claim 9, wherein the locking mechanism comprises a locking fastener that is configured to engage the locking plate, the locking block, and extend into the locking channel of the tonneau rail.

11. The tonneau cover system according to claim 1, wherein the attachment mechanism comprises an attachment fastener that is configured to extend into or through the attachment block and the attachment hole.

12. A bed rail system comprising:
   a tonneau rail comprising an attachment finger;
   an attachment mechanism comprising an attachment block that is configured to attach to an attachment hole of an attachment surface associated with a vehicle; and
   a locking mechanism comprising a locking plate;
   wherein the attachment finger is configured to engage a portion of the attachment block, and the locking plate is configured to engage another portion of the attachment block.

13. The bed rail system according to claim 12, wherein the attachment mechanism comprises an attachment anchor that is configured to engage the attachment hole.

14. The bed rail system according to claim 12, wherein the attachment block is located between the attachment surface and the tonneau rail.

15. The bed rail system according to claim 12, wherein a top portion of the mounting block comprises a notched portion and/or a bottom portion of the mounting block comprises a notched portion.

16. A method for attaching the bed rail system of claim 12 to the vehicle, comprising:
   attaching the attachment block to the attachment surface; and
   hooking the attachment finger of the tonneau rail over a top portion of the attachment block.

17. The method according to claim 16, wherein the method comprises locking the tonneau rail to the attachment block by engaging both of the tonneau rail and the attachment block with the locking plate.

18. The bed rail system according to claim 12, wherein the attachment mechanism comprises an attachment fastener that is configured to extend into or through the attachment block and the attachment hole.

19. The bed rail system according to claim 12, wherein the attachment finger is configured to engage a top portion of the attachment block.

20. The bed rail system according to claim 12, wherein the locking plate is configured to engage a bottom portion of the attachment block.

\* \* \* \* \*